United States Patent [19]

Iwaibana

[11] Patent Number: 4,862,277
[45] Date of Patent: Aug. 29, 1989

[54] IMAGING DEVICE WITH HAND WOBBLE DISPLAY CIRCUIT

[75] Inventor: Kunio Iwaibana, Osaka, Japan

[73] Assignee: NEC Home Electronics Ltd., Osaka, Japan

[21] Appl. No.: 250,723

[22] Filed: Sep. 29, 1988

[30] Foreign Application Priority Data

Oct. 19, 1987 [JP] Japan .................. 62-263324

[51] Int. Cl.⁴ ............................. H04N 5/21
[52] U.S. Cl. .................... 358/222; 358/224
[58] Field of Search .......... 358/222, 105, 109, 125, 358/126, 139, 224

[56] References Cited

U.S. PATENT DOCUMENTS

| | | | |
|---|---|---|---|
| 3,518,378 | 6/1970 | Johns | 358/222 |
| 4,403,256 | 9/1983 | Green et al. | 358/222 |
| 4,410,914 | 10/1983 | Siau | 358/222 |
| 4,449,144 | 5/1984 | Suzuki | 358/105 |
| 4,713,697 | 12/1987 | Gotou et al. | 358/222 |
| 4,779,095 | 10/1988 | Guerreri | 358/105 |

Primary Examiner—Jin F. Ng
Assistant Examiner—Stephen Brinich
Attorney, Agent, or Firm—Cushman, Darby & Cushman

[57] ABSTRACT

An imaging device such as a video camera having a viewfinder for displaying an imaging signal to the photographer which indicates the degree of hand wobble (i.e., movement of the camera by the photographer). A hand wobble display circuit generates this imaging signal for the viewfinder by generating a field-difference or a frame-difference signal of the electronic viewfinder signal and displaying the difference signal on the viewfinder. The magnitude of the difference signal can be used to determine the degree of hand wobble.

9 Claims, 2 Drawing Sheets

IMAGING DEVICE WITH HAND WOBBLE DISPLAY CIRCUIT

BACKGROUND OF THE INVENTION

1. Field of The Invention

The present invention relates to an imaging device capable of giving an alarm of a photographer's hand wobble to the photographer through a viewfinder.

2. Description of the Prior Art

An imaging device such as a video camera is typically arranged such that an image of an object is caught by employing an objective lens, and the image is converted into an electric signal through a solid state imaging element and fed to an image processing circuit, this signal then being displayed on an electronic viewfinder. In the great majority of cases, the electronic viewfinder, unlike an optical viewfinder, provides a reproduction of an image having complete fidelity to the real object, thereby providing an offhand judgment as to whether the imaging state is good or bad. In this type of viewfinder, it is possible to display such imaging conditions as overexposure or underexposure or white balance when in a full-auto mode or in a preset mode.

The above-described conventional imaging device can provide the photographer with a variety of advantages because of the arrangement in which various types of information on the imaging states and imaging conditions may be displayed on the viewfinder. However, no appropriate measure is taken for the hand wobble (movement of the camera caused by the photographer) of the imaging device often caused by beginners. Inexperienced photographers fail to perceive their hand wobble during photographing, and the hand wobble thus will not be found until photographed picture is reproduced. A problem thereby arises in which the photographer inadvertently misses a precious imaging opportunity.

SUMMARY OF THE INVENTION

Accordingly, it is a primary object of the present invention to obviate the above-mentioned problems by providing an imaging device such as a video camera having a viewfinder for displaying an imaging signal for the photographer, and a hand wobble display circuit, connected to the viewfinder, for generating a field-difference signal or a frame-difference signal from the imaging signal and displaying the difference signal on the viewfinder as a signal indicative of the degree of hand wobble.

The present invention thus functions to prevent faulty photographing due to hand wobble. The prevention of such a fault involves the steps of connecting the hand wobble display circuit to the viewfinder for displaying the imaging signal for the photographer and displaying the field-difference signal or the frame-difference signal generated from the imaging signal on the viewfinder as a signal for indicating the degree of hand wobble.

DETAILED DESCRIPTION OF THE PREFERRED EMBODIMENTS

An embodiment of the present invention will hereinafter be described with reference to FIGS. 1 to 4.

Figure 1:
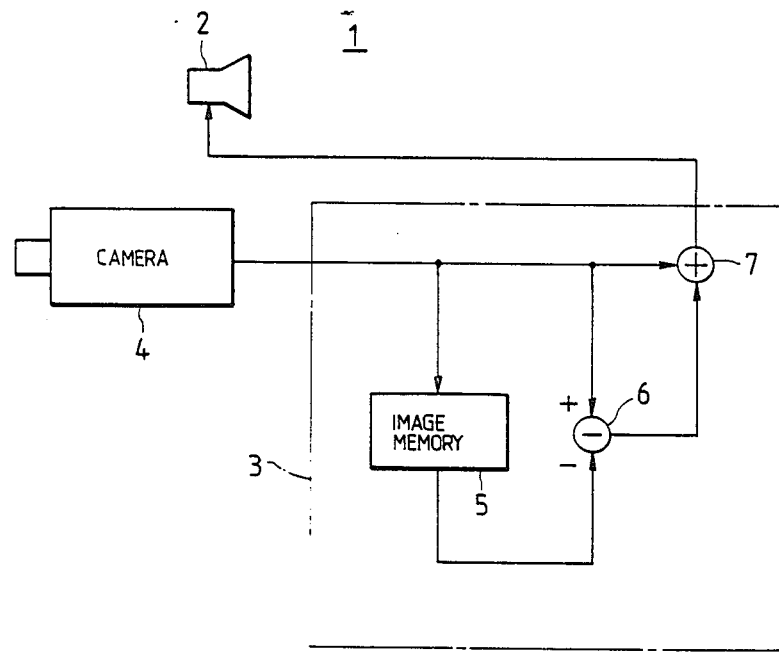
FIG. 1 is a circuit diagram illustrating one embodiment of an imaging device according to the present invention.
Figure 2:
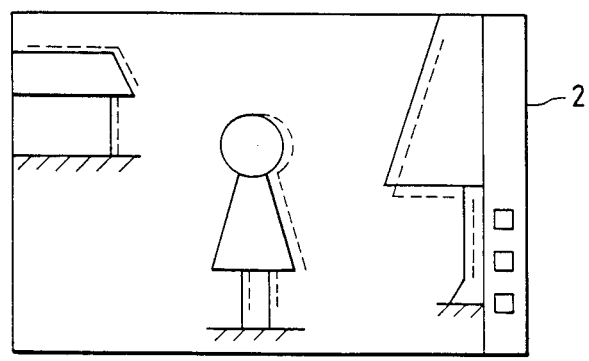
FIG. 2 is a diagram of a picture displayed on a viewfinder when hand wobble takes place, illustrating one embodiment thereof.
Figure 3:
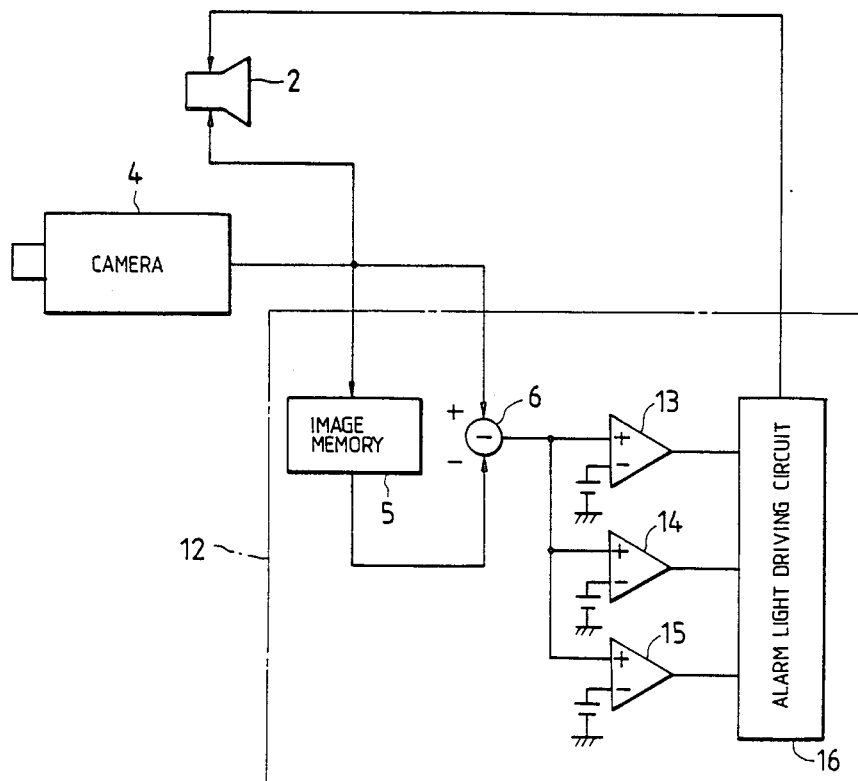
FIG. 3 is a circuit diagram illustrating another embodiment of the imaging device according to the present invention.

FIG. 1 is a circuit diagram illustrating one embodiment of an imaging device according to the present invention, and FIG. 2 is a diagram depicting a picture displayed on a viewfinder when hand wobble takes place.

In FIG. 1, the imaging device generally indicated at 1 is constructed by connecting a hand wobble display circuit 3 for directly indicating a frame-difference signal generated from an imaging signal as a signal for indicating a degree of hand wobble on a viewfinder 2 for displaying the imaging signal for the photographer. The hand wobble display circuit 3 in accordance with this embodiment consists essentially of an image memory 5 for storing the imaging signals equivalent to one frame which are transmitted from a camera device body 4, a subtracter 6 for subtracting the imaging signals of the previous frame, which have been written into the image memory 5, from the present imaging signals in order to generate frame-difference signals, and an adder 7 for adding the outputs of the subtracter 6 to the present imaging signals.

If hand wobble occurs during photographing, the difference signals between the present imaging signals and the imaging signals of the previous frame increase in magnitude. As a result, for a static object, as illustrated in FIG. 2, the frame-difference signals superposed on the present imaging signals are combined to form a double image (represented by solid and broken lines in FIG. 2), with the result that the photographer who observes the image through the viewfinder 2 is able to perceive the hand wobble immediately after looking at the double image. Hence, it a double image of the picture displayed on the viewfinder 2 is caused, the photographer can correct the hand wobble at once by tightly regripping the device body 4.

The imaging device 1 is, as explained earlier, arranged in such a manner that the hand wobble display circuit 3 is connected to the viewfinder 2 for displaying the imaging signal for the photographer, and the frame-difference signal generated from the imaging signal is directly displayed on the viewfinder 2 as a signal for indicating the degree of hand wobble. Therefore, the object is displayed as a double image simultaneously when hand wobble takes place, whereby the photographer can directly perceive the hand wobble. This arrangement contributes to the prevention of fault in the photographing which is attributed to such hand wobble. It is also thereby possible to provide a stable condition under which photographers ranging from beginners to the experienced are able to concentrate on the photographing of the object.

In the above-described embodiment, the following arrangement may be effected. A color filter (not illustrated) for admitting a particular color signal component alone may be interposed between the subtracter 6 and the adder 7, whereby the frame-difference signal becomes a red, green or blue monochromatic signal. A monochromatic shadow emphasizes the fact that the double-image is attributed to hand wobble.

Figure 4:
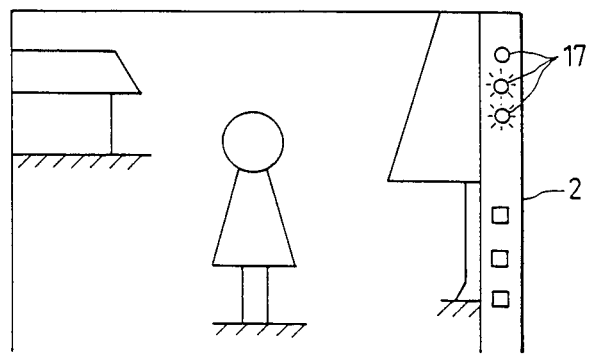
FIG. 4 is a diagram of the picture displayed on the viewfinder when hand wobble takes place, illustrating another embodiment thereof.

In the foregoing embodiment, the hand wobble is displayed directly on the viewfinder 2 by superposing the hand wobble on the imaging signal. In the case of an imaging device 11 depicted in FIG. 3, on the other hand, the magnitude of the frame-difference signals obtained from the subtracter 6 are compared with each other by means of three comparators 13, 14 and 15, each having a different comparative threshold within the hand wobble display circuit 12. Based on the comparative results, an alarm light driving circuit 16 is actuated, thereby selectively lighting up hand wobble alarm lights 17 disposed along the fringe of the display picture frame of the viewfinder 2 as shown in FIG. 4. Thus, the degree of hand wobble may be displayed in three stages. It thus follows that the hand wobble caused is indirectly displayed on the basis of the number of the hand wobble alarm lights 17 lit up in accordance with the degree of hand wobble. This method is, it can also be said, more suitable for photographers of all levels in terms of effects of visual pursuit than the double-image display method described in the foregoing embodiment of FIG. 1.

Furthermore, in the above-described embodiments, the image memory 5 is not confined to a frame memory but may involve the use of a field memory capable of storing the imaging signals equivalent to one field. Thus, the field-difference signal or the frame-difference signal generated from the imaging signal may be displayed on the viewfinder as a signal for indicating the degree of hand wobble.

Also, as noted above, the object to be imaged may be displayed as a double image concurrently with the occurrence of hand wobble by displaying, e.g., a signal indicating the degree of hand wobble on the viewfinder by superposing this signal directly on the imaging signal. In this way, hand wobble can directly be determined by the photographer. The signal for indicating the degree of hand wobble also may be compared in magnitude with a preset reference value, thus indicating stepwise the degree of hand wobble. In this arrangement, as noted above, it is possible to indirectly give an alarm of hand wobble, and fault in the photographing due to the hand wobble can thereby be prevented. Accordingly, the photographers, whether beginners or experienced, may be able to stably concentrate on the photographing.

What is claimed is:

1. An imaging device for reproducing images comprising:
    a viewfinder for displaying an imaging signal representing the image to be reproduced to a user of said imaging device; and
    a hand wobble display circuit, connected to said viewfinder, for generating a difference signal from said imaging signal and displaying said difference signal on said viewfinder, the magnitude of said difference signal indicating the degree of hand wobble of said imaging device by said user.

2. An imaging device in accordance with claim 1, wherein said difference signal is a frame-difference signal representing the difference in said imaging signal between successive frames.

3. An imaging device in accordance with claim 2, wherein said hand wobble display circuit comprises an image memory for storing a frame of said imaging signals, a subtracter for subtracting stored imaging signals of a previous frame from the present frame of imaging signals so as to generate said frame-difference signal, and an adder for adding said frame-difference signal to the present frame of imaging signals for display on said viewfinder.

4. An imaging device in accordance with claim 2, wherein said hand wobble display circuit comprises an image memory for storing a frame of said imaging signals, a subtracter for subtracting stored imaging signals of a previous frame from the present frame of imaging signals so as to generate said frame-difference signal, at least one comparator for comparing said frame-difference signal to at least one threshold, and an alarm driving circuit for lighting at least one alarm light on said viewfinder for each threshold exceeded by said frame-difference signal.

5. An imaging device in accordance with claim 4, wherein said at least one alarm light is disposed along the periphery of the displayed image frame of said viewfinder.

6. An imaging device in accordance with claim 1, wherein said difference signal is a field-difference signal representing the difference in said imaging signal between successive fields.

7. An imaging device in accordance with claim 6, wherein said hand wobble display circuit comprises an image memory for storing a field of said imaging signals, a subtracter for subtracting stored imaging signals of a previous field from the present field of imaging signals so as to generate said field-difference signal, and an adder for adding said field-difference signal to the present field of imaging signals for display on said viewfinder.

8. An imaging device in accordance with claim 6, wherein said hand wobble display circuit comprises an image memory for storing a field of said imaging signals, a subtracter for subtracting stored imaging signals of a previous field from the present field of imaging signals so as to generate said field-difference signal, at least one comparator for comparing said field-difference signal to at least one threshold, and an alarm driving circuit for lighting at least one alarm light on said viewfinder for each threshold exceeded by said field-difference signal.

9. An iaging device in accordance with claim 8, wherein said at least one alarm light is disposed along the periphery of the displayed image field of said viewfinder.

* * * * *